Patented July 18, 1950

2,515,913

UNITED STATES PATENT OFFICE 2,515,913

2-METHYL-5-PHENYLBENZOTHIAZOLE AND QUATERNARY SALTS THEREOF

Gertrude Van Zandt, Austin, Tex., and Leslie G. S. Brooker, Rochester, N. Y., assignors to Eastman Kodak Company, Rochester, N. Y., a corporation of New Jersey No Drawing. Application November 22, 1946, Serial No. 711,816

11 Claims. (Cl. 260—304)

This invention relates to 2-methyl-5-phenylbenzothiazole and quaternary salts thereof.

2-methyl-α-naphthothiazole and 2-methyl-β-naphthothiazole are well known bases which can be converted to quaternary salts which are valuable intermediates in the preparation of certain kinds of methine dyes, e. g. benzothiacyanine dyes.

We have now discovered a new base containing two benzene rings and a thiazole ring, the base differing from the known naphthothiazoles in that it contains a biphenyl nucleus rather than a naphthalene nucleus. Our new base can be represented by the following formula:

I
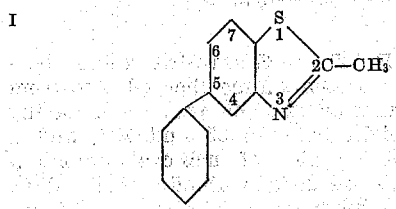

and can be called 2-methyl-5-phenylbenzothiazole. From our new base quaternary salts can be made, and from these quaternary salts, methine dyes which sensitize photographic emulsions can be prepared.

It is, accordingly, an object of our invention to provide 2-methyl-5-phenylbenzothiazole and a process for preparing the same. A further object is to provide quaternary salts of 2-methyl-5-phenylbenzothiazole and a process for preparing them. A further object is to provide methine dyes and processes for preparing them. A still further object is to provide photographic emulsions sensitized with such dyes. Other objects will become apparent hereinafter.

In accordance with our invention, we prepare 2-methyl-5-phenylbenzothiazole by reducing bis-(3-nitro-4-biphenylyl)-disulfide with zinc and acetic acid and acetylating the reduction product with acetic anhydride or acetyl chloride, whereupon the 2-methyl-5-phenylbenzothiazole is formed. The reduction product is advantageously acetylated with acetic anhydride.

The following example will serve to illustrate further the manner of obtaining our new base.

*Example 1.—2-methyl-5-phenylbenzothiazole*

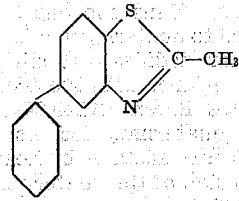

28.05 g. (1 mol.) of bis(3-nitro-4-biphenylyl)-disulfide were suspended in 182 cc. of glacial acetic acid and the suspension was heated to steam bath temperature. 48.2 g. of zinc dust were added in small portions, with mechanical stirring, to the hot suspension. Then 15.1 g. (2.44 mol.) of acetic anhydride were added and the reaction mixture was heated on the steam bath with continued stirring, for one hour. The reaction mixture was then allowed to stand overnight at steam bath temperature, and then filtered while hot. The residue on the filter was washed with about 50 cc. of hot acetic acid and the washings collected. The combined filtrate and washings were cooled by adding ice and were then made ammoniacal. The 2-methyl-5-phenylbenzothiazole separated as an oil which was taken up in about 2 liters of diethyl ether. The ether extract was dried over anhydrous sodium sulfate, filtered, and then the filtrate was fractionally distilled. On redistillation of the fraction containing the base, the 2-methyl-5-phenylbenzothiazole was obtained in 13 per cent yield boiling at 209 to 210° C. at 8 mm. of Hg pressure.

The bis(3-nitro-4-biphenylyl)disulfide employed above was prepared as follows: 36.1 g. (2 mol.) of 4-bromo-3-nitrobiphenyl (Case, Jour. Am. Chem. Soc. 58, 1249, 1936) were dissolved in 150 cc. of boiling methyl alcohol. To this was added portionwise a solution of sodium disulfide prepared by dissolving 3.95 g. (1 mol.+90 per cent excess) of sulfur in a solution of 9.6 g. (1 mol.+90 per cent excess) of sodium sulfide in 15 cc. of water, and the whole was refluxed for 2 hours. The reaction mixture was then chilled and the bis disulfide which separated was collected on a filter and washed with water. The bis disulfide was then stirred with a little methyl alcohol and the mixture allowed to stand for about 12 hours. The yellow, solid bis disulfide was then filtered off and dried.

To prepare quaternary salts from our new base, we heat the base with an alkyl salt, e. g. methyl, ethyl, n-propyl or n-butyl p-toluenesulfonate or benzenesulfonate, n-butyl chloride, n-propyl bromide, methyl, ethyl, n-propyl, n-butyl or isobutyl, iodide, dimethyl sulfate, diethyl sulfate, β-ethoxyethyl bromide, β-hydroxyethylbromide, carboxymethyl bromide, carbethoxymethyl bromide, benzyl iodide, allyl bromide, etc. The quaternary salts thus obtained can be converted to less soluble quaternary salts by double decomposition with water-soluble metal salts. Thus, the quaternary p-toluenesulfonates can be converted to the less soluble quaternary iodides by treatment of a hot alcoholic solution of a quaternary p-toluenesulfonate with an aqueous solution of an alkali metal iodide, e. g. potassium iodide. Similarly the quaternary iodides can be converted to the less soluble quaternary perchlorates by treatment of a hot alcoholic solution of a quaternary iodide with an aqueous solution of an alkali metal perchlorate, e. g. sodium perchlorate. Moreover, the less soluble quaternary salts can be converted to more soluble quaternary salts. Thus the quaternary iodides can be converted to quaternary chlorides by heating the quaternary iodides with silver chloride in a phenol, in accordance with the process set forth in United States Patent 2,245,249, dated June 10, 1941. The quaternary iodides can be converted to quaternary acetates by heating an ethyl alcoholic suspension of the quaternary iodide and silver acetate, filtering off the silver salts and recovering the quaternary acetate from the ethyl alcoholic solution. Our new quaternary salts can be represented by the following general formula:

II

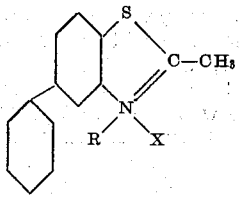

wherein R represents an alkyl group, i. e. an alcohol radical, e. g. methyl, ethyl, n-propyl, n-butyl, isobutyl, allyl, β-ethoxyethyl, β-hydroxyethyl, carboxymethyl, carbethoxymethyl, benzyl, etc. and X represents an anion, e. g. chloride, bromide, iodide, benzenesulfonate, p-toluenesulfonate, methylsulfate, ethylsulfate, perchlorate, acetate, etc. Several examples further illustrating the formation of our new quaternary salts from alkyl salts will be found hereinafter as a part of examples illustrating the preparation of dyes.

Our new quaternary salts can be employed to prepare cyanine dyes which can be represented by the following general formula:

III

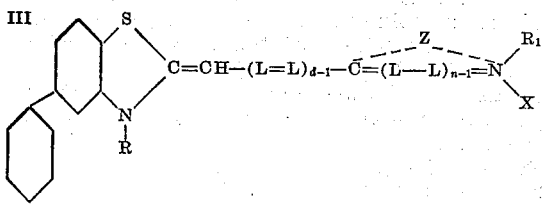

wherein $d$ represents a positive integer of from 1 to 4, $n$ represents a positive integer of from 1 to 2, L represents a methine group (i. e. —CH=, —C(CH$_3$)=, etc., R has the value given above, i. e. an alkyl group, R$_1$ represents an alkyl group which may be the same as, or different from R, X has the value given above, i. e. an anion, and Z represents the non-metallic atoms necessary to complete a heterocyclic nucleus containing from 5 to 6 atoms in the heterocyclic ring, e. g. a heterocyclic nucleus of the thiazole series (for instance thiazole, 4-methylthiazole, 4-phenylthiazole, 4,5-diphenylthiazole, etc.), a heterocyclic nucleus of the benzothiazole series (for instance benzothiazole, 5-chlorobenzothiazole, 6-chlorobenzothiazole, 5 - dimethylaminobenzo - thiazole, 6 - methoxybenzothiazole, 6 - methyl - benzothiazole, 5-methylbenzothiazole, 5-bromobenzothiazole, 4-methoxybenzothiazole, 7-chlorobenzothiazole, etc.), a heterocyclic nucleus of the naphthothiazole series (for instance α-naphthothiazole, β-naphthothiazole, etc.), a heterocyclic nucleus of the selenazole series (for instance selenazole, 4 - methylselenazole, 4 - phenyl - selenazole, etc.), a heterocyclic nucleus of the benzoselenazole series (for instance benzoselenazole, 5-chlorobenzoselenazole), a heterocyclic nucleus of the benzoxazole series (for instance benzoxazole, 5 - phenylbenzoxazole, 5 - chloro - benzoxazole, 5 - methoxybenzoxazole, etc.), a heterocyclic nucleus of the quinoline series (for instance quinoline, 6 - methoxyquinoline, 6 - chloroquinoline, etc.), etc.

To obtain monomethine cyanine dyes of the above general Formula III wherein $d$ represents 1, we condense a quaternary salt of 2-methyl-5-phenylbenzothiazole (represented by Formula II above) with a cyclammonium quaternary salt selected from those represented by the following general formula:

IV

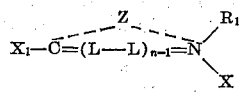

wherein L, $n$, R$_1$, X and Z have the values given above and X$_1$ represents a member selected from the group consisting of a halogen atom having an atomic weight between 35 and 127, and a thioether group. Typical of such cyclammonium quaternary salts are: 2-iodoquinoline methiodide, ethiodide, n-propiodide or n-butiodide, 2-iodoquinoline benziodide, 2-bromoquinoline propobromide, 4-chloroquinoline metho-p-toluenesulfonate, 2-n-butylmercaptoquinoline ethiodide, 2-phenylmercaptoquinoline ethiodide, 2-β-naphthylmercaptoquinoline ethiodide, 2-p-chlorophenylmercaptoquinoline ethiodide, 2-methylmercaptobenzothiazole metho-p-toluenesulfonate, 2-ethylmercapto-5,6-dioxymethylenebenzothiazole etho-p-toluenesulfonate, 2-methylmercaptobenzoxazole etho-p-toluenesulfonate, 4-phenylmercaptopyridine ethiodide, 4-phenylmercaptoquinoline ethiodide, 2-methylmercapto-β-naphthothiazole metho-p-toluenesulfonate, 2-methylmercapto-p-naphthoxazole p-toluenesulfonate, etc.

The condensations are advantageously carried out in the presence of a basic condensing agent (acid-binding agent), e. g. a tertiary amine, especially a tertiary amine having an ionization constant greater than $10^{-5}$ at 25° C., e. g. trialkylamines (trimethylamine, triethylamine, tri-n-propylamine, tri-n-butylamine, etc.), trihydroxyalkylamines (triethanolamine, tripropanolamine, etc.), N-alkylpiperidine (N-methylpiperidine, N-ethylpiperidine, etc.) and so forth. Alkali metal carbonates, e. g. sodium and potassium carbonate, can also be employed as basic condensing agent. The condensations are advantageously carried out in a solvent, especially an alcohol, e. g. ethyl n-propyl, isobutyl or n-butyl alcohol, i. e. an alcohol of the formula $C_nH_{2n+1}$ wherein $n$ represents a positive integer of from 1 to 4. Pyridine can also be used as a solvent.

To obtain trimethine cyanine dyes of the above general Formula III wherein $d$ represents 2, we condense a quaternary salt of 2-methyl-5-phenyl-benzothiazole (represented by Formula II above) with a cyclammonium quaternary salt selected from those represented by the following general formula:

V 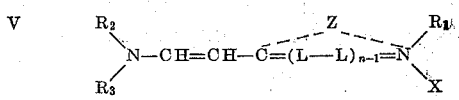

wherein $n$, $R_1$, X and Z have the values given above, and $R_2$ represents an aryl group, e. g. phenyl, p-chlorophenyl, p-tolyl, etc. and $R_3$ represents a member selected from the group consisting of a hydrogen atom, an alkyl group (especially methyl or ethyl) and an acyl group (especially acetyl, propionyl or butyryl). Typical of such cyclammonium quaternary salts are: 2-β-acetanilidovinylbenzoxazole ethiodide, 2-β-acetanilidovinylbenzothiazole ethiodide, 2-β-acetanilidovinylquinoline ethiodide, 4-β-acetanilidovinylquinoline n-butiodide, 2-β-acetanilidovinyl-β-naphthothiazole ethiodide, 2-anilinovinylthiazoline methiodide, 2-β-acetanilidovinylbenzothiazole pheniodide, 2-β-acetanilidovinylbenzoselenazole ethiodide, 2-β-acetanilidovinyl-4-methylthiazole methiodide, 2-β-acetanilidovinyl-4-phenylthiazole ethiodide, 2-β-acetanilidovinyl-3,3'-dimethylindolenine methiodide, 2-[2-(N-methylanilino)vinyl]-benzothiazole ethiodide, 2-(β-acetanilidovinyl)-3,4 - trimethylenebenzothiazolium iodide, etc.

These condensations which give the trimethine cyanine dyes are advantageously carried out in the presence of a basic condensing agent (acid-binding agent), e. g. a tertiary amine, especially a tertiary amine having an ionization constant greater than $10^{-5}$ at 25° C., e. g. trialkylamines (trimethylamine, triethylamine, tri-n-propylamine, tri-n-butylamine, etc.), trihydroxyalkylamines (triethanolamine, tripropanolamine, etc.), N-alkylpiperidines (N-methylpiperidine, N-ethylpiperidine, etc.) and so forth. The condensations are advantageously carried out in a solvent, especially an alcohol, e. g. ethyl, n-propyl, isobutyl or n-butyl alcohol, i. e. an alcohol of the formula $C_nH_{2n+1}OH$ wherein $n$ represents a positive integer of from 1 to 4. Pyridine is likewise an efficacious solvent and in some cases suffices as basic condensing agent.

To prepare symmetrical trimethine dyes of the above general Formula III (i. e. where $d$ equals two, $n$ equals one and Z represents the nonmetallic atoms necessary to complete a 5-phenylbenzothiazole nucleus), we condense a quaternary salt of 2-methyl-5-phenylbenzothiazole (Formula II above) with an orthocarboxylic ester. Typical esters of orthocarboxylic acids include: triethyl orthoformate, tri-n-propyl orthoformate, tri-n-butyl orthoformate, triethyl orthoacetate, triethyl orthopropionate, triethyl orthophenylacetate, triethyl orthobenzoate, trimethyl ortho-n-valerate, methyl diethyl ortho-n-caproate, methyl diethyl orthoisocaproate, trimethyl ortho-p-toluate, etc. The condensations are advantageously effected in pyridine or quinoline.

To prepare trimethine cyanine dyes of the above general Formula III (wherein $d$ represents two) we can also condense a quaternary salt of 2-methyl-5-phenylbenzothiazole (represented by Formula II above) with a cyclammonium quaternary salt selected from those represented by the following general formula:

VI 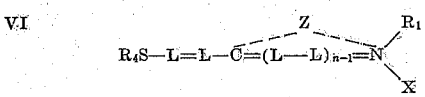

wherein L, $n$, $R_1$, X and Z have the values given above and $R_4$ represents an alkyl group, e. g. methyl, ethyl, n-butyl, etc. Typical of the quaternary salts set forth by Formula VI are: 2-(2-methylmercapto-1-butenyl)benzothiazole metho-p - toluenesulfonate, 2 - (2'-methylmercaptopropenyl)-β-naphthothiazole metho-p-toluenesulfonate, 2 - (2-methylmercaptopropenyl)-3,4-trimethylenebenzothiazolium-p-toluenesulfonate, 2-(2-methylmercaptopropenyl)benzothiazole etho-p-toluenesulfonate, 2-(2-methylmercapto-1-butenyl)-benzothiazole metho-p-toluenesulfonate, 5-chloro-2-(2-methylmercapto-1-butenyl)benzoselenazole metho - p - toluenesulfonate, 2 - (2-methylmercaptostyryl)-β-naphthothiazole ethiodide, 5 - chloro-2-(2-methylmercaptopropenyl)-benzothiazole ethiodide, 2-(2-methylmercaptopropenyl)quinoline etho-p-toluenesulfonate, 2-(2 - methylmercaptopropenyl) - 4'-phenylthiazole etho-p-toluenesulfonate, 2-(1-methyl-2-methylmercapto-1-butenyl)benzothiazole metho-p-toluenesulfonate, 2-(β-cyclopropyl-β-methylmercaptovinyl)benzothiazole metho-p-toluenesulfonate, 2'-(β - cyclopropyl - β - methylmercaptovinyl)-β-naphthothiazole metho - p-toluenesulfonate, 5-chloro - 2 - (β - cyclopropyl - β - methylmercaptovinyl)benzothiazole metho - p-toluenesulfonate, 2 - (β-cyclopropyl-β-methylmercaptovinyl)benzoselenazole metho-p-toluenesulfonate, 2-(β-cyclobutyl - p - methylmercaptovinyl)benzothiazole metho - p - toluenesulfonate, 2-(β-cyclohexyl-β-methylmercaptovinyl)benzothiazole metho-p-toluenesulfonate, 3,3-dimethyl-2-(β-methylmercaptovinyl)indolenine methomethyl sulfate, etc. Many of these β-alkylmercaptoalkenyl compounds are known substances. Others are described in the copending applications of Grafton H. Keyes, Serial Nos. 597,149, filed June 1, 1945, now U. S. Patent 2,429,469; 620,161, filed October 3, 1945, now U. S. Patent 2,500,126, and 620,162, filed October 3, 1945, now U. S. Patent 2,486,173. These condensations to give trimethine cyanine dyes are advantageously carried out in the presence of a basic condensing agent and solvent, e. g. the basic condensing agents and solvents set forth above under the condensations involving the cyclammonium quaternary salts of Formula V.

To prepare pentamethine cyanine dyes of the above general Formula III (wherein $d$ represents three), we condense a quaternary salt of 2-methyl-5-phenylbenzothiazole (represented by Formula II above) with a cyclammonium quaternary salt selected from those represented by the following general formula:

VII 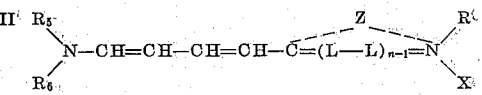

wherein $n$, L, R, X and Z have the values given above, $R_5$ represents a member selected from the group consisting of a hydrogen atom and an alkyl group (especially methyl or ethyl) and an acyl group (especially acetyl), propionyl or butyryl), and $R_6$ represents an aryl group, e. g. phenyl. Typical of such cyclammonium quaternary salts are: 4-(4-acetanilido-1,3-butadienyl)quinoline ethiodide, 2-(4-anilino-1,3-butadienyl)benzothiazole ethiodide, 2-(4-anilino-1,3-butadienyl)-5,6-dimethoxybenzothiazole ethiodide, 2-(4-anilino-1,3-butadienyl)-α-naphthothiazole ethiodide, 2-(4-anilino-1,3-butadienyl)-5-methoxybenzoselenazole ethiodide, 2-(4-anilino-1,3-butadienyl)-6-methylquinoline ethiodide, 2-(4-anilino-3-methyl-1,3-butadienyl)benzothiazole ethiodide, etc. These condensations are advantageously carried out in the presence of a basic condensing agent and solvent, e. g. the basic condensing agents and solvents set forth above under the condensations involving the cyclammonium quaternary salts of Formula V.

To prepare symmetrical pentamethine dyes of the above Formula III (i. e. where $d$ equals three, $n$ equals one and Z represents the non-metallic atoms necessary to complete a 5-phenyl-benzothiazole nucleus), we condense at least two molecular proportions of a quaternary salt of 2-methyl-5-phenylbenzothiazole (Formula II above) with one molecular proportion of a β-aryl-aminoacrolein anil salt, e. g. β-anilinoacrolein anil hydrochloride. The condensations are advantageously carried out in the presence of a basic condensing agent and solvent; advantageously the alcohol solvents and tertiary amines set forth above which have an ionization constant at 25° C. greater than $10^{-5}$.

To prepare heptamethine cyanine dyes of the above general Formula III (wherein $d$ represents five), we condense a quaternary salt of 2-methyl-5-phenylbenzothiazole (represented by Formula II above) with a cyclammonium quaternary salt selected from those represented by the following general formula:

VIII 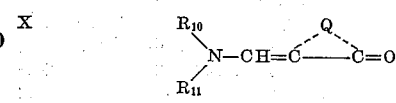

wherein $n$, L, R, X and Z have the values given above, $R_7$ represents a member selected from the group consisting of a hydrogen atom and an alkyl group (especially methyl and ethyl) and an acyl group (especially acetyl, propionyl or butyryl) and $R_8$ represents an aryl group, e. g. phenyl. Typical of such cyclammonium quaternary salts are: 2-(6-anilino-1,3,5-hexatrienyl)benzothiazole ethiodide, 2-(6-acetanilido-1,3,5-hexatrienyl)benzothiazole ethiodide, 2-(6-acetanilido-1,3,5-hexathienyl)benzoxazole ethiodide, 2-[6-(N-methylanilino)-1,3,5-hexatrienyl]benzoselenazole ethiodide, 6-methyl-2-[6-(N-methylanilino)-1,3,5-hexatrienyl]quinoline ethiodide, 4-[6-(N-methylanilino)-1,3,5-hexatrienyl]quinoline methiodide, etc. The condensations are advantageously carried out in the presence of a basic condensing agent and solvent, e. g. the basic condensing agents and solvents set forth above under the condensations involving the cyclammonium quaternary salts of Formula V.

To prepare symmetrical heptamethine dyes of the above Formula III (i. e. where $d$ represents four, $n$ equals 1 and Z represents the non-metallic atoms necessary to complete a 5-phenylbenzothiazole nucleus), we condense at least two molecular proportions of a quaternary salt of 2-methyl-5-phenylbenzothiazole (Formula II above) with one molecular proportion of a glutaconic aldehyde dianilide salt, e. g. glutaconic aldehyde dianilide hydrochloride. The condensations are advantageously carried out in the presence of a basic condensing agent and solvent; advantageously the alcohol solvents and tertiary amines set forth above which have an ionization constant at 25° C. greater than $10^{-5}$. Secondary amines having such ionization constants, e. g. piperidine, diethylamine, etc. can also be used.

Our new quaternary salts can be employed to prepare merocyanine dyes which can be represented by the following general formula:

IX 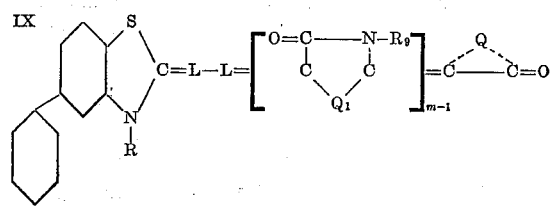

wherein L and R have the values given above, $m$ represents a positive integer of from 1 to 2, $Q_1$ represents an oxygen atom, a sulfur atom or a group of the formula

wherein R' represents an alcohol radical (i. e. an alkyl group, substituted or unsubstituted) or an aryl group, $R_9$ represents a member selected from the group consisting of an alkyl group and an aryl group, and Q represents the nonmetallic atoms necessary to complete a heterocyclic nucleus containing from 5 to 6 atoms in the heterocyclic ring, e. g. a rhodanine nucleus, a 2-thio-2,4(3,5)-oxazoledione nucleus, a 2-thiohydantoin nucleus, a 5-pyrazolone nucleus, a 2,4(3,5)-thiazoledione nucleus, a 4(5)-thiazolone nucleus, a barbituric acid nucleus, a thiobarbituric acid nucleus, etc.

To prepare merocyanine dyes of the above general Formula IX (wherein $m$ represents 1) we condense a quaternary salt of 2-methyl-5-phenylbenzothiazole (Formula II above) with an arylaminomethylene compound of the following general formula:

X 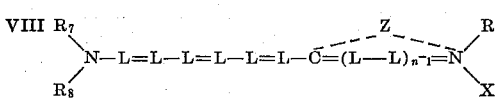

wherein Q has the value given above, $R_{10}$ represents a member selected from the group consisting of a hydrogen atom, and an acyl group (especially acetyl, propionyl or butyryl) and $R_{11}$ represents an aryl group, e. g. phenyl or naphthyl. Typical of such arylaminomethylene compounds are: 5-anilinomethylenerhodanine, 5-acetanilidomethylene-3-ethylrhodanine, 5-acetanilidomethylene-3-phenylrhodanine, 5-acetanilidomethylene-3-ethyl-2-thio-2,4(3,5)-oxazoledione, 5-acetanilidomethylene-3-ethyl-1-phenyl-2-thiohydantoin, 4-acetanilidomethylene-3-methyl-1-phenyl-5-pyrazolone, 5-acetanilidomethylene-2-diphenylamino-4(5)-thiazolone, etc.

These condensations are advantageously carried out in the presence of a basic condensing agent and solvent, advantageously the alcohol solvents and tertiary amines which have an ionization constant at 25° C. greater than $10^{-5}$ which are set forth above.

The merocyanine dyes of the above general Formula IX (wherein $m$ represents 1) can also be prepared by condensing a quaternary salt of 2-methyl-5-phenylbenzothiazole (Formula II above) with an ester of an orthocarboxylic acid and a ketomethylene compound of the following general formula:

XI
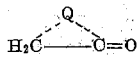

wherein Q has the value given above. Typical of such ketomethylene compounds are: rhodanine, 3-ethylrhodanine, 3-phenylrhodanine, 3-β-hydroxyethylrhodanine, 3-ethyl-2-thio-2,4(3,5)-oxazoledione, 3-ethyl-1-phenyl-2-thiohydantoin, 3-methyl-1-phenyl-5-pyrazolone, 2-diphenylamino-4(5)-thiazolone, 2-ethylphenylamino-4(5)-thiazolone, barbituric acid, thiobarbituric acid, etc.

Typical esters of orthocarboxylic acids are given above. The condensations are advantageously effected in the presence of a basic condensing agent and solvent. The alcoholic solvents and tertiary organic amines having an ionization constant at 25° C. greater than $10^{-5}$ which are set forth above are advantageously employed.

Merocarbocyanine dyes of the above general Formula IX (wherein $m$ represents 1) can also be prepared by condensing a β-arylaminovinyl-5-phenylbenzothiazole alkyl quaternary salt, especially a 2-β-acylarylaminovinyl-5-phenylbenzothiazole alkyl quaternary salt, with a ketomethylene compound of the general Formula XI. 2-β-acetanilidovinyl-5-phenylbenzothiazole alkyl quaternary salts are advantageously employed. The condensations are advantageously effected in the presence of a basic condensing agent and solvent. The alcoholic solvents and the tertiary organic amines having an ionization constant at 25° C. greater than $10^{-5}$ which are set forth above are advantageously employed.

To prepare merocyanine dyes of the above general Formula IX (wherein $m$ represents 2) we treat a merocyanine dye of the following general formula:

XII
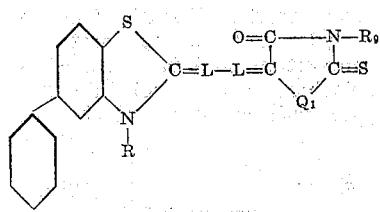

wherein L, Q₁, R and R₉ have the values given above with an alkyl salt to obtain a quarternary alkylmercapto compound of the following general formula:

XIII
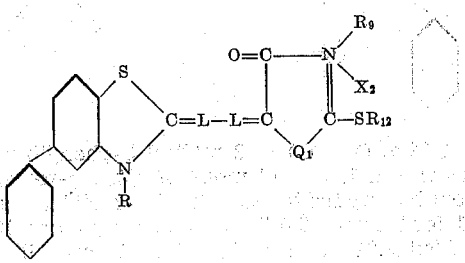

wherein L, Q₁, R, and R₉ have the values given above, and R₁₂ represents an alcohol radical (i. e. an alkyl group, substituted or unsubstituted) and X₂ represents an anion. We then condense the quaternary alkylmercapto compound with a heterocyclic compound containing 5 to 6 atoms in the ring and containing in the ring a ketomethylene (—CH₂—CO—) group. These condensations which give the complex merocyanine dyes of Formula IX above (wherein $m$ represents 2) are advantageously carried out in the presence of a basic condensing agent, e. g. a trialkylamine, pyridine or a N-alkylpiperidine or an alkali metal carbonate, using a lower molecular weight alcohol as reaction medium.

The following examples will serve to illustrate further the manner of practicing our invention.

*Example 2.—1',3-diethyl-6'-methoxy-5-phenylthia-2'-cyanine p-toluenesulfonate*

1.13 g. (1 mol.) of 2-methyl-5-phenylbenzothiazole and 1 g. (1 mol.) of ethyl p-toluene sulfonate were heated in an oil bath at 110 to 115° C. for 5 days. To the quaternary salt thus formed were added 10 cc. of ethyl alcohol, 2.19 g. (1 mol.) of 6-methoxy-2-phenylmercaptoquinoline etho-p-toluene sulfonate and 0.51 g. (1 mol.) of triethylamine, and the whole was refluxed for 20 minutes. The above-formulated dye separated upon chilling. The yield of dye was 15 per cent crude and 12 per cent after two recrystallizations from methyl alcohol (35 cc. per gram of dye). The dye was obtained as orange crystals melting at 235 to 237° C. with decomposition. The dye sensitized a photographic gelatino-silver-bromoiodide emulsion to about 570 μ with maximum sensitivity at about 540 μ.

In like manner, 1'-ethyl-6'-methoxy-3-methyl-5-phenylthia-2'-cyanine p-toluenesulfonate was prepared by using the quaternary salt prepared by heating 1.43 g. (1 mol.) of 2-methyl-5-phenylbenzothiazole and 0.93 g. (1 mol.) of methyl p-toluenesulfonate together in an oil bath at 115 to 120° C. for 16 hours. The yield of dye was 7 per cent crude and 3 per cent after three recrystallizations from methyl alcohol. The orange powder had a melting point of 244° C. with decomposition and softening from 233° C. The dye sensitized a photographic gelatino-silver-bromoiodide emulsion to about 557 mμ with maximum sensitivity at about 540 mμ.

In like manner, 3-β-carboxyethyl-1'-ethyl-6'-methoxy-5-phenylthia-2'-cyanine iodide was prepared by using the quaternary salt prepared by heating 9 g. (1 mol.) of 2-methyl-5-phenylbenzothiazole and 8 g. (1 mol.) of β-iodopropionic acid for 16 hours at 135° C. To the quaternary salt thus formed were added 100 cc. of ethyl alcohol, 18.8 g. (1 mol.) of 6-methoxy-2-phenylmercaptoquinoline etho-p-toluenesulfonate and 8 g. (2 mols.) of triethylamine, and the whole was refluxed for 1 hour. The reaction mixture was chilled and 10 cc. of glacial acetic acid added. The dye separated. It was filtered off and recrystallized from 75 per cent (by weight) aqueous acetic acid. It was obtained as red crystals, melting at 210 to 212° C. with decomposition. The dye sensitized a gelatino-silver-bromoiodide emulsion to 590 mμ with maximum sensitivity at 550 and 570 mμ.

Example 3.—3,3'-diethyl-5-phenylthiacyanine iodide

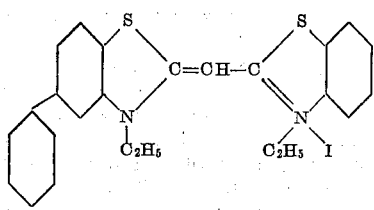

1.12 g. (1 mol.) of 2-methyl-5-phenylbenzothiazole and 0.77 g. (1 mol.) of diethyl sulfate were heated together in an oil-bath at 110–115° C. for about 6 days. To the crude quaternary salt were added 1.74 g. (1 mol.) of 2-ethylmercaptobenzothiazole etho-ethylsulfate, 15 cc. of ethyl alcohol and 0.56 g. (1 mol.+10 per cent excess) of triethylamine. The reaction mixture was heated at the refluxing temperature for 30 minutes. Diethyl ether (200 cc.) was added to the cool mixture and the whole was chilled at 0° C. The ether-alcohol layer was decanted, and the hot methyl alcoholic solution of the residue was treated with a hot solution of potassium iodide (3 g.) in water (30 cc.) After chilling at 0° C., the dye was collected on a filter and washed with water and then acetone. The yield of dye was 40 percent crude and 31 per cent, in two crops, after two recrystallizations from methyl alcohol. The greenish-yellow crystals had a melting point of 252–253° C. with decomposition and they sensitized a photographic gelatino-silver-chlorobromide emulsion with maximum sensitivity at about 450 mµ.

Example 4.—3,3'-diethyl-5,5'-diphenylthiacarbocyanine bromide

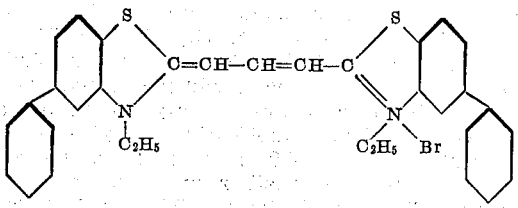

1.5 g. (2 mols.) of 2-methyl-5-phenylbenzothiazole and 1.33 g. (2 mols.) of ethyl p-toluenesulfonate were heated in an oil-bath at 115–120° C. for 93 hours. To the crude quaternary salt were added 10 cc. of dry pyridine and 1.48 g. (1 mol.+200 per cent excess) of ethyl orthoformate. The reaction mixture was heated at the refluxing temperature for 45 minutes and the hot solution was treated with a hot solution of potassium bromide (3 g.) in water. After chilling overnight at 0° C., the dye was collected on a filter and washed with water and then acetone. The yield of dye was 30 per cent crude and 18 per cent after two recrystallizations from methyl alcohol (110 cc. per gram of dye). The bronze prisms had melting point 278–279° C. with decomposition, and they sensitized a photographic gelatino-silver-bromoiodide emulsion to about 660 mµ with maxima sensitivity at about 550 mµ and 600 mµ.

In like manner, 3,3'-diethyl-9-methyl-5,5'-diphenylthiacarbocyanine bromide was prepared by using 1.62 g. (1 mol.+200 per cent excess) of ethyl orthoacetate in place of the ethyl orthoformate. The yield of dye was 8 per cent crude and 3 per cent after three recrystallizations from methyl alcohol. The minute purplish crystals with blue reflex had melting point 300–301° C. with decomposition, and they sensitized a photographic gelatino-silver-bromoiodide emulsion to about 650 mµ with maxima sensitivity at about 530 mµ and 585 mµ.

In like manner, 3,3',9-triethyl-5,5'-diphenylthiacarbocyanine iodide was prepared by using 1.76 g. (1 mol.+200 per cent excess) of ethyl orthoproprionate in place of the ethyl orthoformate, and precipitating the dye p-toluenesulfonate as the iodide. The yield of dye was 10 per cent crude and 5 per cent after two recrystallizations from methyl alcohol. The brown crystals had melting point 265–267° C. with decomposition, and they sensitized a photographic gelatino-silver-bromoiodide emulsion to about 660 mµ with maximum sensitivity at about 625 mµ.

Example 5.—9-ethyl-3,3'-dimethyl-5,5'-diphenylthiacarbocyanine iodide

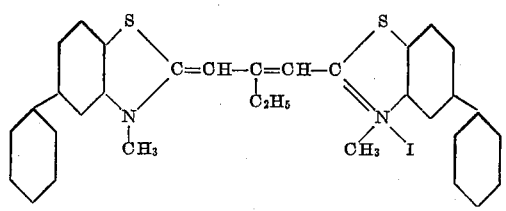

1.5 g. (2 mols.) of 2-methyl-5-phenylbenzothiazole and 1.24 g. (2 mols.) of methyl p-toluenesulfonate were heated together in an oil-bath at 115–120° C. for 3 hours. To the crude quaternary salt were added 10 cc. of pyridine and 1.76 g. (1 mol.+200 per cent excess) of ethyl orthopropionate. The reaction mixture was heated at the refluxing temperature for 45 minutes and the hot solution was treated with a hot solution of potassium iodide (3 g.) in water. After chilling at 0° C., the dye was collected on a filter and washed with water. The yield of dye was 32 per cent crude and 5 per cent after three recrystallizations from methyl alcohol. The very dark greenish powder had melting point 247–251° C. with decomposition, and it sensitized a photographic gelatino-silver-bromoiodide emulsion to about 660 mµ with maximum sensitivity at about 620 mµ.

Example 6.—1',3-diethyl-5-phenylthia-4'-dicarbocyanine iodide

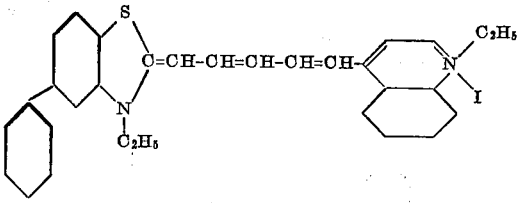

1.12 g. (1 mol.) of 2-methyl-5-phenylbenzothiazole and 1.00 g. (1 mol.) of ethyl p-toluenesulfonate were heated together in an oil bath at 115° C. for 5 days. To the crude quaternary salt were added 2.21 g. (1 mol.) of 4-(4-acetanilido-1,3-butadienyl)-quinoline ethiodide, 10 cc. of ethyl alcohol and 1.01 g. or triethylamine and the reaction mixture was heated at the refluxing temperature for 15 minutes. The cool mixture was stirred with ether. After chilling at 0° C., the ether layer was decanted and the residue was stirred with water. The aqueous layer was decanted and then the remaining portion was stirred with acetone. After chilling overnight at 0° C., the dye was collected on a filter. The yield of dye was 7 per cent after two recrystallizations from methyl alcohol. The dark metallic crystals softened and decomposed from 167° C., and they sensitized a photographic gelatino-silver-bromoiodide emulsion with maximum sensitivity at about 765 mμ.

*Example 7. — 1'-butyl-3-ethyl-5-phenylthia-4'-carbocyanine iodide*

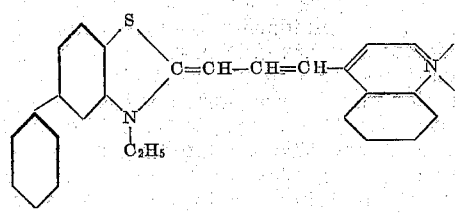

0.58 g. (1 mol.) of 2-β-acetanilidovinyl-5-phenylbenzothiazole ethiodide, 0.36 g. (1 mol.) of lepidine n-butiodide and 10 cc. of pyridine were heated together at the refluxing temperature for 15 minutes. The cool mixture was stirred with ether and the whole chilled. The ether-pyridine layer was decanted. The residue was stirred with water and filtered. The dye was transferred to a beaker and stirred with acetone. After chilling at 0° C., the dye was collected on a filter and washed with acetone. The yield of dye was 34 per cent crude and 22 per cent after three recrystallizations from methyl alcohol. The dark blue crystals decomposed about 252° C., and they sensitized a photographic gelatino-silver-bromoiodide emulsion from about 560mμ to about 710 mμ with maximum sensitivity of about 670 mμ.

The 2-β-acetanilidovinyl-5-phenylbenzothiazole ethiodide was prepared by heating 6.05 g. (1 mol.) of 2-methyl-5-phenylbenzothiazole ethiodide, 3.11 g. (1 mol.) of diphenylformamidine and 30 cc. of acetic anhydride at the refluxing temperature for 30 minutes. After chilling overnight at 0° C., the solids were collected on the filter and washed with water. The yield of product was 25 per cent.

The 2-methyl-5-phenylbenzothiazole ethiodide was prepared as follows: 4.5 g. (1 mol.) of 2-methyl-5-phenylbenzothiazole and 4.0 g. (1 mol.) of ethyl p-toluenesulfonate were heated together at 115–120° C. for about 90 hours. The crude quaternary salt was dissolved in hot ethyl alcohol and treated with a hot solution of sodium iodide (4.5 g.) in ethyl alcohol. After cooling, the product was collected on a filter.

*Example 8.—3-ethyl-5-[(3-ethyl-5-phenyl-2(3)-benzothiazolylidene)-isopropylidene]-2 - thio-2,4(3,5)-oxazoledione*

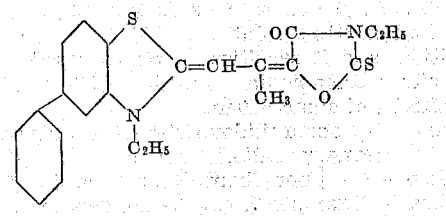

2.25 g. (1 mol.) of 2-methyl-5-phenylbenzothiazole and 2.00 g. (1 mol.) of ethyl p-toluenesulfonate were heated together in an oil-bath at 115° C. for 5 days. To the crude quaternary salt were added 1.45 g. (1 mol.) of 3-ethyl-2-thio-2,4(3,5)-oxazoledione, 10 cc. of ethyl alcohol, 3.24 g. (1 mol.)+100 per cent excess) of ethyl orthoacetate and 1.01 g. (1 mol.) of triethylamine, and the reaction mixture was heated at the refluxing temperature for 5 hours. After chilling overnight at 0° C., the dye was collected on a filter and washed with methyl alcohol. The yield of dye was 8 per cent crude and 5 per cent after two recrystallizations from acetic acid (180 cc. per gram of dye). The reddish-brown crystals had melting point 259–261° C. with decomposition, and they sensitized a photographic gelatino-silver-bromoiodide emulsion to about 610 mμ with maximum sensitivity at about 560 mμ.

*Example 9.—3,3'-diethyl-5,5'-diphenylthiadicarbocyanine iodide*

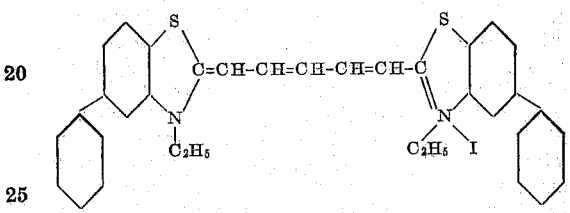

2.25 g. (2 mols.) of 2-methyl-5-phenylbenzothiazole and 2.00 g. (2 mols.) of ethyl p-toluenesulfonate were heated together in an oil-bath at 115° C. for 5 days. To the crude quaternary salt were added 1.29 g. (1 mol.) of β-anilinoacrolinanil hydrochloride, 10 cc. of ethyl alcohol and 1.01 g. (2 mols.) of triethylamine, and the reaction mixture was heated at the refluxing temperature for 20 minutes. The cool mixture was stirred with ether. After chilling, the ether-alcohol layer was decanted. The residue was stirred with cold methyl alcohol and filtered. The residue was dissolved in hot methyl alcohol and treated with a hot solution of potassium iodide (3 g.) in water. After chilling the dye was collected on a filter and washed with water. The yield of dye was 9 per cent crude and 6 per cent after two recrystallizations from methyl alcohol. The minute bluish crystals with metallic reflex had melting point 276–277° C. with decomposition, and they sensitized a photographic gelatino-silver-bromoiodide emulsion from about 680 to about 720 mμ with maximum sensitivity at about 700 mμ.

*Example 10.—5-[(3-ethyl-5-phenyl-2(3)-benzothiazolylidene)ethylidene]-3-laurylrhodanine*

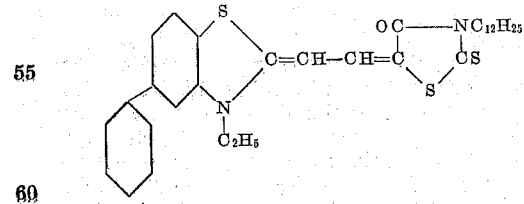

1.01 g. (1 mol.) of triethylamine was added to the suspension of 3.81 g. (1 mol.) of 2-methyl-5-phenylbenzothiazole ethiodide and 4.46 g. (1 mol.) of 5-acetanilidomethylene-3-laurylrhodanine in 50 cc. of ethyl alcohol. The reaction mixture was heated at the refluxing temperature for 35 minutes. After chilling overnight at 0° C., the dye was collected on a filter and washed with methyl alcohol. The yield of dye was 81 per cent crude and 64 per cent after two recrystallizations from ethyl alcohol. The red needles with a blue reflex had melting point 175–176° C. with decomposition, and they sensitized a photographic gelatino-silver-bromoiodide emulsion to about 615 mμ with maximum sensitivity at about 590 mμ.

Example 11.—3,3'-diethyl-5,5'-diphenyl-thiatricarbocyanine ethylsulfate

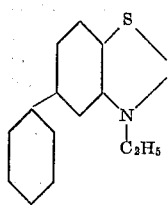 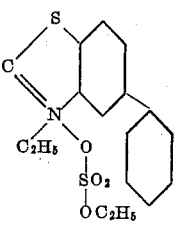

2.25 g. (2 mols.) of 2-methyl-5-phenylbenzothiazole and 1.54 g. (2 mols.) of diethyl sulfate were heated together in an oil-bath at 110–115° C. for about 5 days. The resulting crude quaternary salt was dissolved in 30 cc. of hot ethyl alcohol. This solution was chilled in ice-water and 1.42 g. (1 mol.) of glutaconic aldehyde dianilide hydrochloride and 0.85 g. (2 mols.) of piperidine were added. The reaction mixture was kept at 5 to 10° C. for about 18 hours. The solid was collected on a filter and thoroughly washed with acetone. The yield of dye was 45 per cent crude and 22 per cent after one recrystallization from methyl alcohol. The bronze-green crystals had melting point 169–170° C. with decomposition, and they sensitized a photographic gelatino-silver-bromoiodide emulsion from about 720 mμ to about 860 mμ with maximum sensitivity at about 810 mμ.

Example 12.—3-ethyl-5-[(3-ethyl-5-phenyl-2(3)-benzothiazolylidene) ethylidene] - 1 - phenyl-2-thiohydantoin

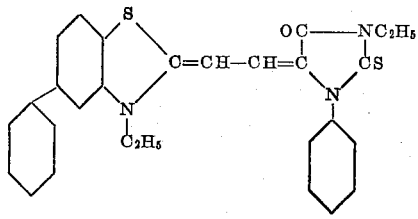

1.31 g. (1 mol.) of 2-acetanilidovinyl-5-phenyl-benzothiazole ethiodide and 0.55 g. (1 mol.) of 3-ethyl-1-phenyl-2-thiohydantoin were heated together in 45 cc. of ethyl alcohol and 0.28 g. (1 mol.+10 per cent excess) of triethylamine at the refluxing temperature for 20 minutes. After chilling at 0° C., the dye was collected on a filter and thoroughly washed with methyl alcohol. The dye was purified by dissolving it in a small volume of pyridine, filtering and adding hot methyl alcohol to the hot pyridine filtrate. After two such purifications the yield of dye was 41 per cent. The red needles had melting point 241–243° C. with decomposition, and they sensitized a photographic gelatino-silver-bromoiodide emulsion to about 615 mμ with maximum sensitivity at about 580 mμ and a minimum at about 510 mμ.

Example 13.—1,3-diethyl-5-[(3 - ethyl-5-phenyl-2(3) - benzothiazolylidene) ethylidene]-2-thiobarbituric acid

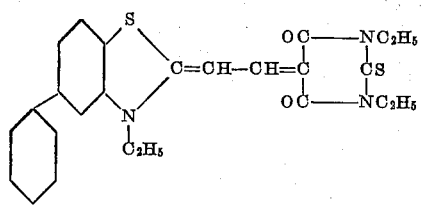

0.28 g. (1 mol.+10 per cent excess) of triethylamine was added to a suspension of 1.31 g. (1 mol.) of 2-β-acetanilidovinyl-5-phenylbenzothiazole ethiodide and 0.50 g. (1 mol.) of 1,3-diethyl-2-thiobarbituric acid in 35 cc. of ethyl alcohol. The reaction mixture was heated at the refluxing temperature for 20 minutes. After chilling at 0° C., the dye was collected on a filter and thoroughly washed with methyl alcohol. The dye was purified by dissolving it in a small volume of pyridine, filtering and adding hot methyl alcohol to the hot pyridine filtrate. After two such purifications, the yield of dye was 69 per cent. The orange needles had melting point about 330° C., and they sensitized a photographic gelatino-silver-bromoiodide emulsion from about 480 to about 550 mμ with maximum sensitivity at about 525 mμ.

Example 14.—2-(3-ethyl-4-oxo-2-thiono-5-thiazolidylidene) - 5 - [(3-ethyl - 5 - phenyl - 2(3) - benzothiazolylidene) ethylidene] - (3 - lauryl-4-thiazolidone

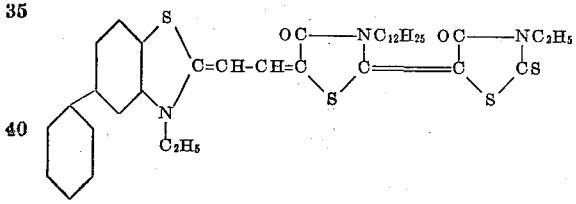

1.13 g. (1 mol.) of 5-[(3-ethyl-5-phenyl-2(3)-benzothiazolylidene) ethylidene] - 3 - laurylrhodanine and 1.86 g. (1 mol.+400 per cent excess) of methyl p-toluenesulfonate were heated together in an oil-bath at 145° C. for 90 minutes. The excess methyl p-toluenesulfonate was removed by stirring the cool crude addition product with ether and filtering. To this crude intermediate were added 0.32 g. (1 mol.) of 3-ethylrhodanine, 25 cc. of ethyl alcohol and 0.21 g. (1 mol.+5 per cent excess) of triethylamine. The reaction mixture was heated at the refluxing temperature for 20 minutes. After chilling at 0° C., the dye was collected on a filter and thoroughly washed with methyl alcohol. The dye was purified by dissolving it in hot pyridine, filtering and adding hot methyl alcohol to the hot pyridine filtrate. After two such purifications, the yield of dye was 58 per cent. The dark crystalline powder had melting point 254–255° C. with decomposition, and it sensitized a photographic gelatino-silver bromoiodide emulsion with maximum sensitivity at about 630 mμ.

The 2-β-acetanilidovinyl-5-phenylbenzothiazole quaternary salts, such as 2-β-acetanilidovinyl - 5 - phenylbenzothiazole ethiodide described in Example 7, can be condensed with 2-methyl-4-phenylbenzothiazole quaternary salts, such as 2-methyl-4-phenylbenzothiazole ethiodide, 2-methyl-4-phenylbenzothiazole metho-p-toluenesulfonate, etc. to give 3,3'-dialkyl-4,5'-diphenylthiacarbocyanine salts. 2 - methyl-4- phenylbenzothiazole quaternary salts are described in our copending application, Serial No. 709,414, filed November 13, 1946 (now United States Patent 2,485,679, dated October 25, 1949. 3,3'-dialkyl-4,5'-diphenylthiacarbocyanine salts can also be prepared by condensing 2-β-acetanilidovinyl-4-phenylbenzothiazole quaternary salts with 2-methyl-5-phenylbenzothiazole quaternary salts. 2-β-acetanilidovinyl-4-phenylbenzothiazole ethiodide and 2-methyl-4-phenylbenzothiazole ethiodide can be prepared as described above in Example 7 for 2-methyl-5-phenylbenzothiazole ethiodide and 2-β-acetanilidovinyl-5-phenylbenzothiazole ethiodide using an equal weight of 2-methyl-4-phenylbenzothiazole to replace the 2-methyl-5-phenylbenzothiazole.

In the same manner shown in Example 3,3'-ethyl-3-methyl-5-phenyloxathiacyanine iodide can be prepared using a portion of 2-methylmercaptobenzoxazole metho-methylsulfate molecularly equivalent to the 2-ethylmercaptobenzothiazole etho-ethylsulfate. In the same manner shown in Example 7, 3,3'-diethyl-5'-phenylselenathiacarbocyanine iodide can be prepared using a portion of 2-methylbenzoselenazole ethiodide molecularly equivalent to the lepidine but-iodide. In the same manner shown in Example 10, additional merocarbocyanine dyes can be prepared replacing the 5-acetanilido-3-laurylrhodanine with molecularly equivalent amounts of 5 - acetanilidomethylene-3-phenylrhodanine, 5-acetanilidomethylene - 3 - ethyl-2-thio-2,4(3,5)-oxazoledione, 5 - actanilidomethylene-3-methylrhodanine, 5-acetanilidomethylene-3-β-hydroxyethylrhodanine, 5-acetanilidomethylene-3-ethyl-1-phenyl-2-thiohydantoin, 4-acetanilidomethylene - 3 - methyl-1-phenyl-5-pyrazolone, 4-acetanilidomethylene - 1 - benzothiazolyl-3-methyl - 5 - pyrazolone, 5-acetanilidomethylene-2-diphenylamino - 4(5) - thiazolone, 5-acetanilidomethylene-2-ethylphenylamino - 4(5) -thiazolone, etc. In the same manner shown in Example 8, additional chain-substituted merocarbocyanine dyes can be prepared by replacing the 3-ethyl-2-thio - 2,4(3,5) - oxazoledione with molecularly equivalent amounts of 3-ethylrhodanine, rhodanine, 3-phenylrhodanine, 3-ethyl-1-phenyl-2-thiohydantoin, 1,3-diphenyl-2-thiohydantoin, etc.

In the same manner shown in Example 12, additional merocarbocyanine dyes can be prepared by replacing the 3-ethyl-1-phenyl-2-thiohydantoin with molecularly equivalent amounts of 3 - ethylrhodanine, rhodanine, 3 - phenylrhodanine, 1,3-diphenylthiohydantoin, etc. In the same manner shown in Example 14, additional complex merocarbocyanines can be prepared by replacing the 3-ethylrhodanine with molecularly equivalent amounts of 3-phenylrhodanine, 3-ethyl-2-thio-2,4(3,5)-oxazoledione, 1,3-diphenyl-2-thiohydantoin, 3 - ethyl - 1 - phenyl - 2 - thiohydantoin, etc.

We have found that our new dyes spectrally sensitized photographic silver halide emulsions when incorporated therein. The dyes are especially useful for extending the spectral sensitivity of the customarily employed gelatino-silver-chloride, gelatino - silver - chlorobromide, gelatino-silver-bromide, gelatino-silver-bromoiodide and gelatino-silver-chlorobromoiodide developing-out emulsions. In the foregoing examples, the sensitizing effect of various of the dyes on at least one gelatino-silver-halide developing-out emulsion is pointed out.

To prepare emulsions sensitized with one or more of our new dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. Methanol has proved satisfactory as a solvent for our new dyes, in most cases. Where the dyes are quite insoluble in alcohol, a mixture of acetone and pyridine may be employed as a solvent. The dyes are advantageously incorporated in the finished, washed emulsions and should be uniformly distributed throughout the emulsions.

The concentration of the dyes in the emulsions can vary widely, e. g. from 5 to 100 mg. per liter of flowable emulsion. The concentration of the dyes will vary according to the type of emulsion and according to the effect desired. The suitable and most economical concentration for any given emulsion will be apparent to those skilled in the art upon making the ordinary tests and observations customarily used in the art of emulsion making. To prepare a gelatino-silver-halide emulsion sensitized with one or more of our new dyes the following procedure is satisfactory. A quantity of dye is dissolved in methyl alcohol (or a mixture of acetone and pyridine) and a volume of this solution, which may be diluted with water, containing from 5 to 100 mg. of dye is slowly added to about 1000 cc. of gelatino-silver-halide emulsion with stirring. Stirring is continued until the dye is thoroughly dispersed in the emulsion.

With most of our dyes from 10 to 20 mg. of dye per liter of gelatino-silver-bromide or bromiodide emulsion (containing about 40 grams of silver halide) suffice to produce the maximum sensitizing effect. With the finer grain emulsions, somewhat larger concentration of dye may be needed to produce the maximum sensitizing effect.

The above statements are only illustrative, as it will be apparent that the dyes will be incorporated in photographic emulsions by any of the other methods customarily employed in the art, e. g. by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

What we claim as our invention and desire to be secured by Letters Patent of the United States is:

1. A compound selected from the group consisting of those represented by the following formulas:

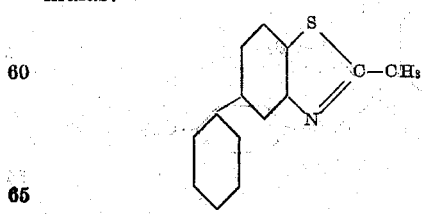

and

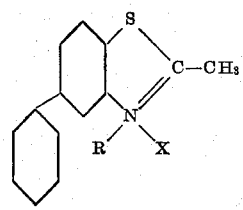

wherein R represents an alkyl group and X represents an anion.

2. 2-methyl-5-phenylbenzothiazole which has the following formula:

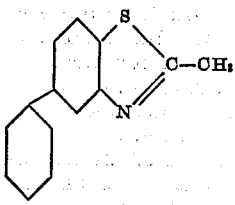

3. A process for preparing 2-methyl-5-phenylbenzothiazole comprising reducing bis(3-nitro-4-biphenylyl) disulfide with zinc and acetic acid and acetylating the reduction product.

4. A process for preparing 2-methyl-5-phenylbenzothiazole comprising reducing bis(3-nitro-4-biphenylyl) disulfide with zinc and acetic acid and acetylating the reduction product with acetyl chloride.

5. A process for preparing 2-methyl-5-phenylbenzothiazole comprising reducing bis(3-nitro-4-biphenylyl) disulfide with zinc and acetic acid and acetylating the reduction product with acetic anhydride.

6. The quaternary salts which are represented by the following general formula:

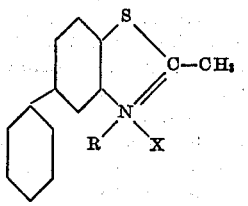

wherein R represents an alkyl group and X represents an anion.

7. The quaternary salts which are represented by the following general formula:

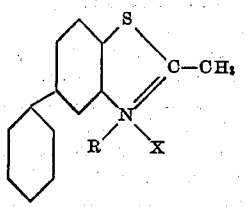

wherein R represents a primary alkyl group of the formula $C_mH_{2m+1}$ wherein $m$ represents a positive integer of from 1 to 4, and X represents an anion.

8. The quaternary salts which are represented by the following general formula:

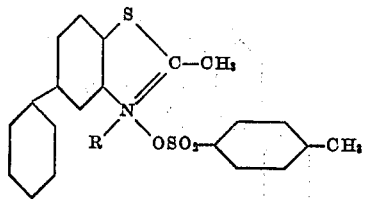

wherein R represents a primary alkyl group of the formula $C_mH_{2m+1}$ wherein $m$ represents a positive integer of from 1 to 4.

9. The quaternary salt which is represented by the following formula:

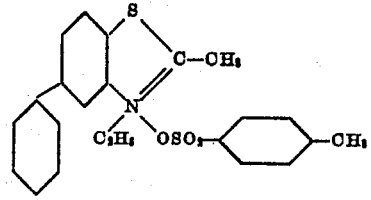

10. The quaternary salt which is represented by the following formula:

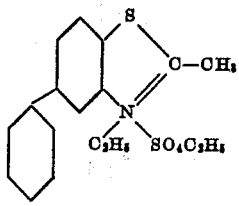

11. The quaternary salt which is represented by the following formula:

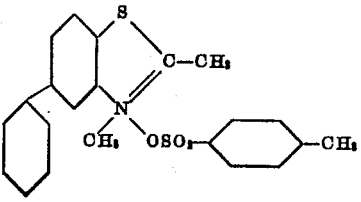

GERTRUDE VAN ZANDT.
LESLIE G. S. BROOKER.

REFERENCES CITED

The following references are of record in the file of this patent:

UNITED STATES PATENTS

| Number | Name | Date |
|---|---|---|
| 2,126,078 | Zeh | Aug. 9, 1938 |
| 2,202,827 | Brooker | June 4, 1940 |
| 2,255,128 | Riester | Sept. 9, 1941 |
| 2,315,498 | Brooker | Apr. 6, 1943 |
| 2,338,782 | Riester | Jan. 11, 1944 |

FOREIGN PATENTS

| Number | Country | Date |
|---|---|---|
| 410,088 | Great Britain | Apr. 30, 1934 |